US009986093B2

United States Patent
Adams

(10) Patent No.: US 9,986,093 B2
(45) Date of Patent: May 29, 2018

(54) SYSTEM AND METHOD OF INTEGRATING TO AN EXTERNAL SEARCH APPLICATION IN AN EMPLOYEE DESKTOP WEB CLIENT

(71) Applicant: Verint Systems UK Limited, Weybridge, Surrey (GB)

(72) Inventor: Conor Adams, Belfast (IE)

(73) Assignee: Verint Systems UK Limited, Weybridge, Surrey (GB)

( * ) Notice: Subject to any disclaimer, the term of this patent is extended or adjusted under 35 U.S.C. 154(b) by 0 days. days.

(21) Appl. No.: 15/217,240

(22) Filed: Jul. 22, 2016

(65) Prior Publication Data
US 2018/0007207 A1    Jan. 4, 2018

(30) Foreign Application Priority Data
Jun. 30, 2016    (EP) .................................... 16177306

(51) Int. Cl.
H04M 3/00 (2006.01)
H04M 5/00 (2006.01)
H04M 3/51 (2006.01)
G06F 17/30 (2006.01)
(Continued)

(52) U.S. Cl.
CPC .... *H04M 3/5191* (2013.01); *G06F 17/30657* (2013.01); *G06F 17/30719* (2013.01); *G06Q 50/26* (2013.01); *H04L 67/02* (2013.01)

(58) Field of Classification Search
CPC ... H04M 3/5183; H04M 3/523; H04M 3/5232
USPC ............ 379/265.09, 265.05, 265.04, 265.11, 379/265.12, 265.01
See application file for complete search history.

(56) References Cited

U.S. PATENT DOCUMENTS 6,338,056 B1 *  1/2002  Dessloch .......... G06F 17/30911
                                                707/711
7,593,522 B2     9/2009  Parker-Stephen
9,356,574 B2 *  5/2016  Denninghoff ...... H03H 9/02622
(Continued)

OTHER PUBLICATIONS

Examination Report for EP16177306.4 dated Nov. 16, 2016.

*Primary Examiner* — Thjuan K Addy
(74) *Attorney, Agent, or Firm* — Christopher M. Scherer; DeWitt Ross & Stevens S.C.

(57) ABSTRACT

In the field of government engagement management, for users of an employee desktop web client, it is now possible, within the web client application, to search and read articles and/or knowledge content that has been authored to external locations. Due to this integration to external, third-party applications, content and/or articles can be displayed to an agent on the employee desktop web client graphical user interface. Agents can enter free text into a specific search field and review the results in summary form, and then select an article in HTML format to progress the current interaction with the client. This functionality adds value to the agent experience and enables the agent to provide an improved service to the end client. Results may be filtered by the search engine as well. Moreover, this system and method improves the operation of the computer in that the computer running such a system in the past was not able to integrate in such a fashion in a web client format. This system and method also enables an agent to handle calls with the web client more efficiently, and allows agents on the web client to automatically classify.

13 Claims, 5 Drawing Sheets

(51) Int. Cl.
*G06Q 50/26* (2012.01)
*H04L 29/08* (2006.01)

(56) References Cited

U.S. PATENT DOCUMENTS

| | | |
|---|---|---|
| 2005/0053224 A1 | 3/2005 | Pennington et al. |
| 2011/0208660 A1 | 8/2011 | Erbey et al. |
| 2012/0109882 A1* | 5/2012 | Bouse .................. H04L 67/306 707/607 |
| 2013/0117289 A1* | 5/2013 | Fischer ................ G06F 17/303 707/756 |
| 2015/0363765 A1* | 12/2015 | Alimi ................ G06Q 20/3227 705/44 |
| 2016/0179906 A1* | 6/2016 | Roustant ........... G06F 17/30675 707/728 |
| 2017/0060856 A1* | 3/2017 | Turtle .................... G06F 17/30 |

* cited by examiner

SYSTEM AND METHOD OF INTEGRATING TO AN EXTERNAL SEARCH APPLICATION IN AN EMPLOYEE DESKTOP WEB CLIENT

CROSS-REFERENCE TO RELATED APPLICATIONS

The present application claims priority of European Patent Application No. 16177306.4, filed Jun. 30, 2016, the content of which is incorporated herein by reference in its entirety.

BACKGROUND

In exemplary government engagement management systems, web client or web-based interaction and engagement systems are unable to accommodate the use of external knowledge searching capabilities. In other words, current systems are unable to use external, third-party systems seamlessly through the engagement management system in order to collect relevant knowledge content for the interaction with a client.

SUMMARY

In the field of government engagement management, for users of an employee desktop web client, it is now possible, within the web client application, to search and read articles and/or knowledge content that has been authored to external locations. Due to this integration to external, third-party applications, content and/or articles can be displayed to an agent on the employee desktop web client graphical user interface. Agents can enter free text into a specific search field and review the results in summary form, and then select an article in HTML format to progress the current interaction with the client. This functionality adds value to the agent experience and enables the agent to provide an improved service to the end client. Results may be filtered by the search engine as well. Moreover, this system and method improves the operation of the computer in that the computer running such a system in the past was not able to integrate in such a fashion in a web client format. This system and method also enables an agent to handle calls with the web client more efficiently, and allows agents on the web client to automatically classify.

In one embodiment of the present application, a method of integrating to an external application for an agent in a web client application, the method comprises starting an interaction with a client with the web client application by the agent, searching for relevant knowledge content through a third-party integration module using a graphical user interface, and completing the interaction with the client with enhanced input from the search step.

In an additional embodiment of the present application, a non-transient computer readable medium programmed with computer readable code that upon execution by a computer processor causes the computer processor to start an interaction with a client with the web client application by the agent, search for relevant knowledge content through a third-party integration module using a graphical user interface, and complete the interaction with the client with enhanced input from the search step.

In another embodiment of the present application, a system for integrating to an external application for an agent in a web client application, the system comprises a client graphical user interface, a server-side application module in communication with the client graphical user interface over a network, a third-party integration module in communication with the server-side module, and a processing system communicatively connected to the third-party integration module, the server-side application module and the client graphical user interface such that the processing system allows the client graphical user interface to seamlessly integrate the external application into the client graphical user interface through the third-party integration module and the server-side application module.

DETAILED DESCRIPTION

In the present description, certain terms have been used for brevity, clearness and understanding. No unnecessary limitations are to be applied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. § 112, sixth paragraph, only if the terms "means for" or "step for" are explicitly recited in the respective limitation.

In the field of government engagement management systems, agents in web client systems may wish to run specific scripts that allow the agent to be more efficient in handling interactions with a customer more efficiently by improving the operation of the system and computer generally. In such cases, the user logs on to an employee desktop web client as an interaction handling agent and starts an interaction with the user, by clicking on a VOICE IN button or another activation button on an interaction bar, thus allowing a script-flow to launch and display to the agent. The agent will then speak the text shown on the graphical user interface to the client and select the menu based on the response of the client. The agent may then be shown different screens in the content panel based on the nature of the call, and the interaction with the client is ended when the client has no more queries for the agent, and/or when the script-flow is completed.

Figure 6:
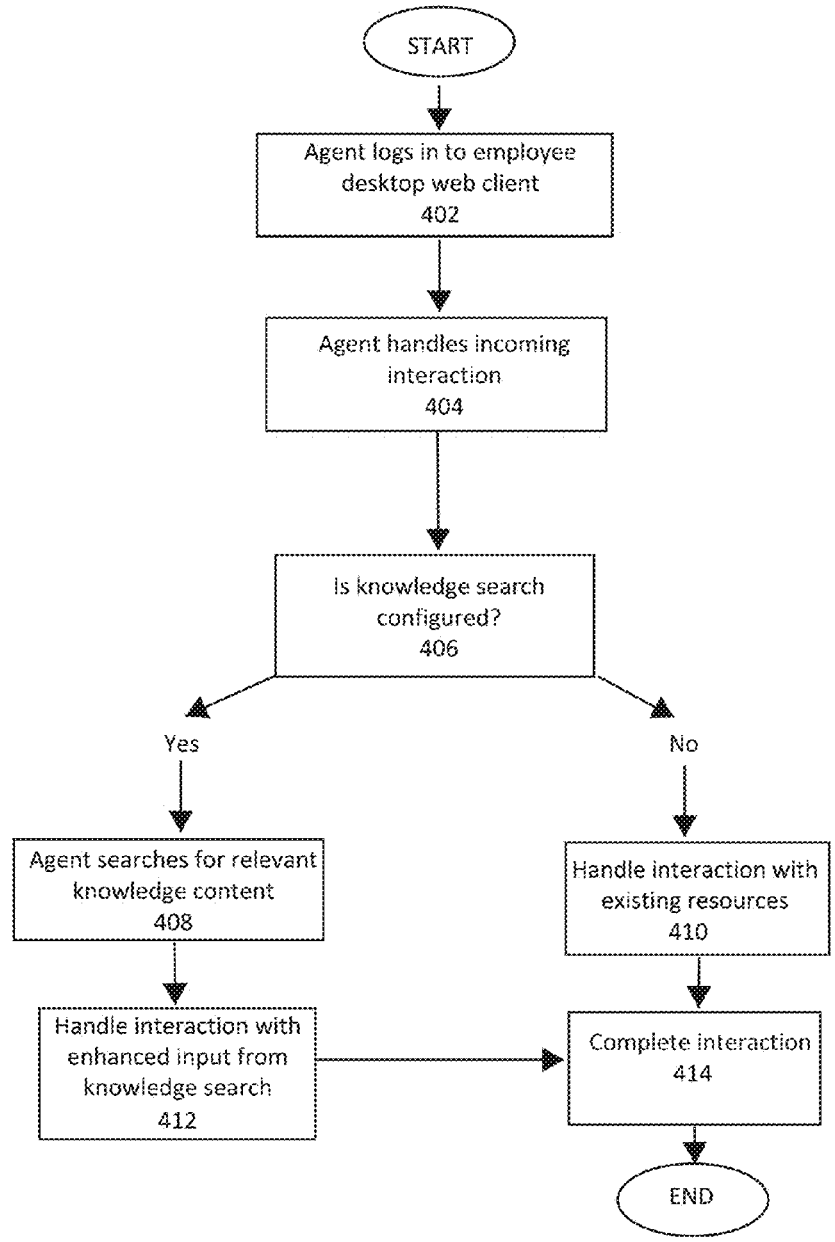
FIG. 6 is a flow chart of an exemplary embodiment of a method of the present application.

FIG. 6 is a flow chart that depicts an exemplary embodiment of a method 400 of external integration. FIG. 6 illustrates a method 400 of the present application, and in an exemplary embodiment is performed in real-time during an agent/client interaction. In step 402, the agent logs into the employee desktop web client application, and in step 404 the agent begins to handle an incoming interaction with a client. If in step 406 the knowledge search feature of the web client application is configured, then the agent is able to conduct searches for relevant knowledge content in step 408. If the knowledge search application is not configured in step 406, then the agent handles the interaction without the knowledge content search capability in step 410, and the interaction with the client is completed in step 414. In step 412, the agent handles and processes the interaction with the enhanced input from the knowledge search in step 408, and then the interaction with the client is completed in step 414.

Figure 2:
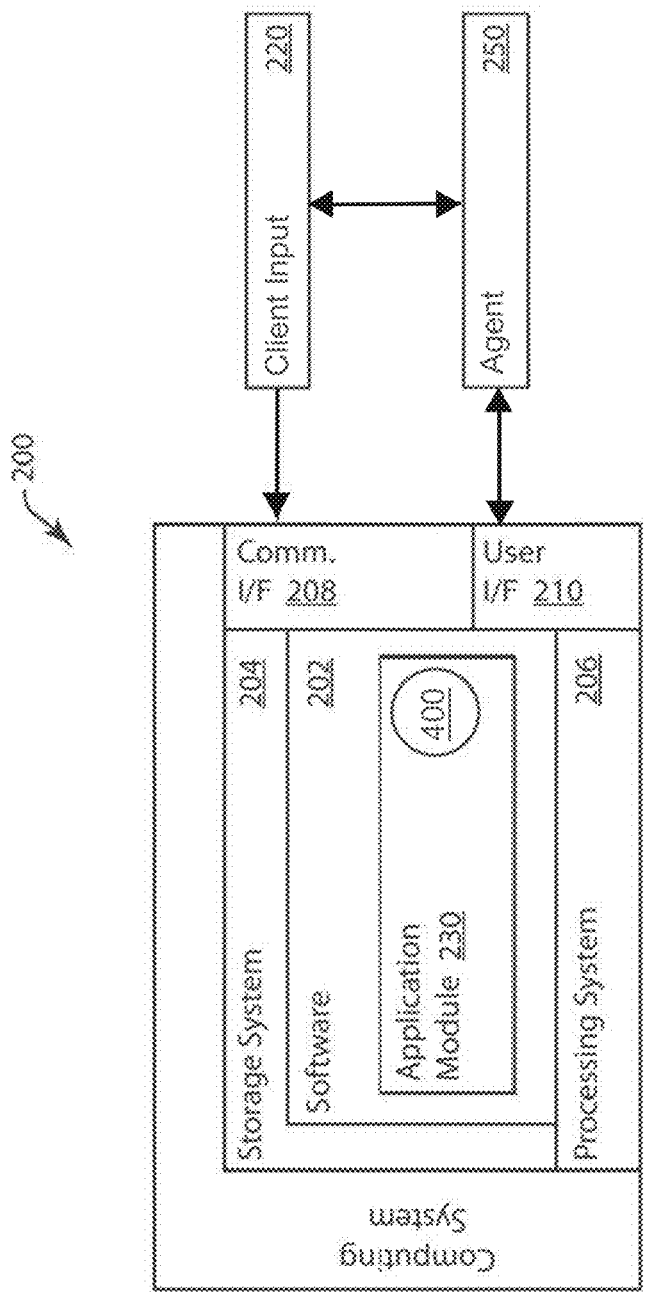
FIG. 2 is a block diagram of an exemplary embodiment of a system of the present application.

FIG. 2 is a system diagram of an exemplary embodiment of a system 200 for external application integration. The system 200 is generally a computing system that includes a processing system 206, storage system 204, software 202, communication interface 208 and a user interface 210. The processing system 206 loads and executes software 202 from the storage system 204, including a software module 230. When executed by the computing system 200, software module 230 directs the processing system 206 to operate as described in herein in further detail in accordance with the method 400, as in further embodiments in accordance with the method 400 described herein with respect to FIG. 6.

Although the computing system 200 as depicted in FIG. 2 includes one software module in the present example, it should be understood that one or more modules could provide the same operation. Similarly, while description as provided herein refers to a computing system 200 and a processing system 206, it is to be recognized that implementations of such systems can be performed using one or more processors, which may be communicatively connected, and such implementations are considered to be within the scope of the description. It is also contemplated that these components of the computing system 200 may be operating in a number of physical locations described below in the system 100 of FIG. 1.

The processing system 206 can comprise a microprocessor and other circuitry that retrieves and executes software 202 from storage system 204. Processing system 206 can be implemented within a single processing device but can also be distributed across multiple processing devices or sub-systems that cooperate in existing program instructions. Examples of processing system 206 include general purpose central processing units, application specific processors, and logic devices, as well as any other type of processing device, combinations of processing devices, or variations thereof.

The storage system 204 can comprise any storage media readable by processing system 206, and capable of storing software 202. The storage system 204 can include volatile and non-volatile, removable and non-removable media implemented in any method or technology for storage of information, such as computer readable instructions, data structures, program modules, or other data. Storage system 204 can be implemented as a single storage device but may also be implemented across multiple storage devices or sub-systems. Storage system 204 can further include additional elements, such a controller capable, of communicating with the processing system 206.

Examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by an instruction execution system, as well as any combination or variation thereof, or any other type of storage medium. In some implementations, the storage media can be a non-transitory storage media. In some implementations, at least a portion of the storage media may be transitory.

User interface 210 can include a mouse, a keyboard, a voice input device, a touch input device for receiving a gesture from a user, a motion input device for detecting non-touch gestures and other motions by a user, and other comparable input devices and associated processing elements capable of receiving user input from a user. Output devices such as a video display or graphical display can display an interface further associated with embodiments of the system and method as disclosed herein. Speakers, printers, haptic devices and other types of output devices may also be included in the user interface 210. An agent 250 communicates with the computing system 200 through the user interface 210 in order to enter client input 220, to manage an interaction, or any number of other tasks the agent 250 may want to complete with the computing system 200 as well be described in greater detail below.

As described in further detail herein, the computing system 200 receives and transmits data through communication interface 208. In embodiments, the communication interface 208 operates to send and/or receive data to/from other devices to which the computing system 200 is communicatively connected, and to received and process client input 220, as will be described in greater detail below. The client input 220 will include details about a request, work order or other set of information that will necessitate an interaction between the client and the agent. Client input 220 may also be made directly to the agent 250, as will be described in further detail below.

Figure 1:
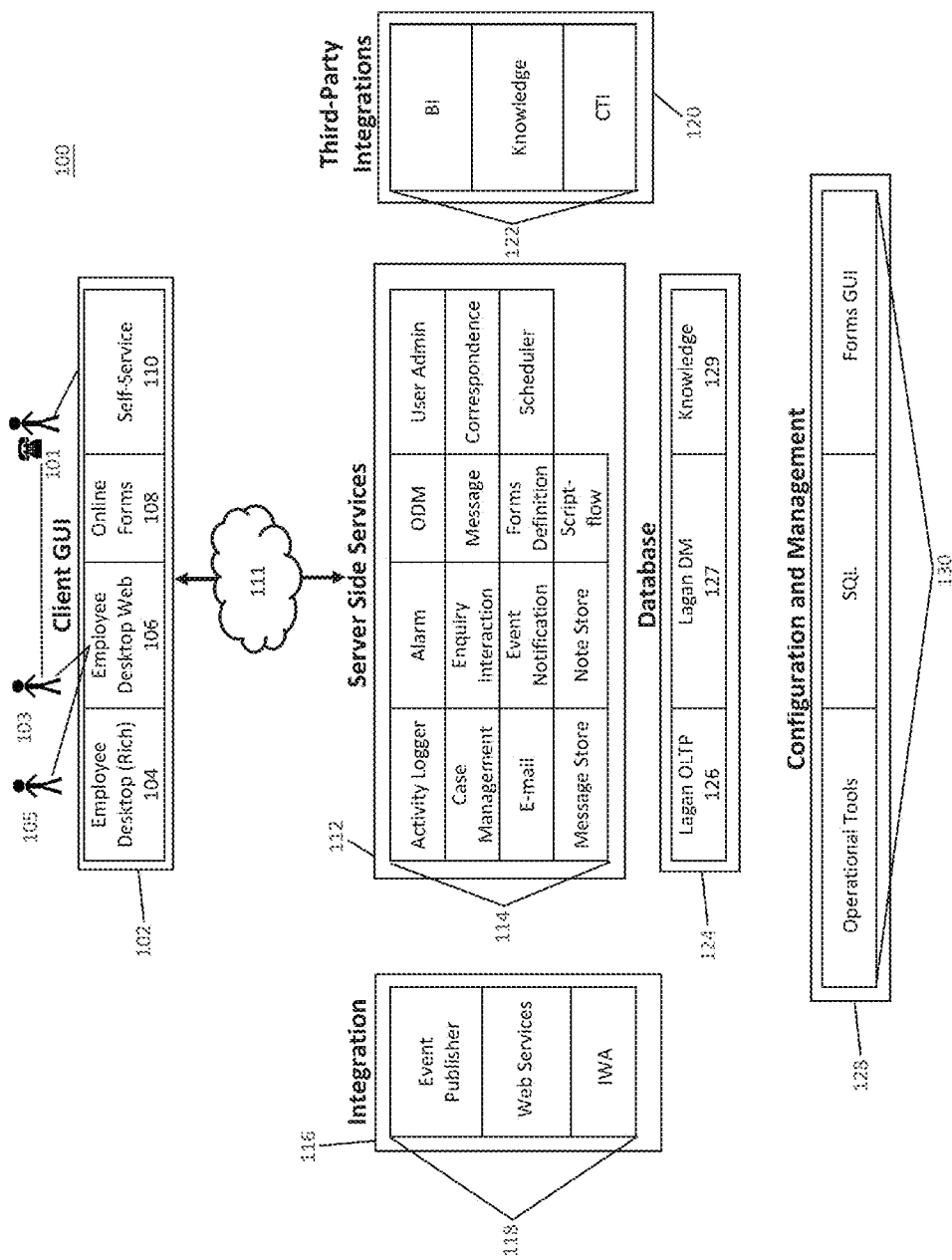
FIG. 1 is a block diagram of an exemplary embodiment of a system of the present application.

FIG. 1 illustrates a block diagram of an engagement management system 100 according to the present application. The client graphical user interface (GUI) 102 includes a number of client applications 104, 106, 108, 110 and serves as the client 101 and agent 103, 105 interface for the system 100. The client GUI 102 may include any of the following applications: first, an employee desktop 104, an employee desktop 106, an online form application 108 and a self-service application 110. The employee desktop 104 is not the subject of this application. The client 101 in such a system 100 may contact the client GUI 102 in order to report a problem, issue and/or make a work request, or any other type of interaction that the client 101 may have with the government entity utilizing this system 100. The client 101 may contact the system 100 in a number of ways over a number of mediums, such as but not limited to, e-mail, voicemail, online access, and/or through direct telephone contact. In the case of utilizing a telephone in order to start an interaction, the user 101 may contact a front-end agent 103 directly to report an incident or work request. The front-end agent 103 will then utilize the employee desktop 106 to create an interaction order for the client. This interaction order may be carried out by the front-end agent 103 at the time of the call or at a later time, or by a back-end agent 105 who may only handle the processing of such orders. The client 101 may also call into the client GUI 102 system and leave a voicemail, e-mail the client GUI 102, or log in to a client app (not shown) in the client GUI 102 in order to create an interaction order as well. The client GUI 102 also includes an online form application 108 that allows the agent 103, 105 to save a number of standard and/or commonly used forms for the agent 103, 105 to use, and a self-service application 110 where the client 100 may log in and create an order without interacting with an agent 103, 105.

The client GUI 102 is therefore the point of interface for the client 101 as well as the agent 103, 105 in the system 100, and is in communication with the remainder of the system through a network 111. The network is preferably the internet, or another LAN, but generally the system 100 described here in the present application is directed toward the employee web desktop application 106, that utilizes a client GUI 102 separated by the remainder of the system 100 through the internet.

The server-side services 112 include a number of service applications 114 utilized by the employee desktop 106. The service applications shown in FIG. 1 are exemplary only, and may be interchanged with other applications and/or some applications may be removed. The system 100 also includes an integration module 116 that includes a number of integration applications 118 that may be utilized to integrate with other portions of the system 100 that are not shown, as well as a third-party integration module 120 that includes third-party integration applications 122 that may be utilized to integrate with other systems and applications outside of the current system 100. In operation, the agent 103, 105 utilizing the client GUI 102 of the employee desktop web application 106 accesses the server-side services 112 through the network 111, and the appropriate server-side services 112 application integrates an external search engine through one of a plurality of third-party integration applications 122 in the third-party integration module 120. This integration to the third party search application is seamlessly integrated into the employee desktop web client application 106 such that the client GUI 102 incorporates the search capabilities into the web client application 106 as will be described in greater detail and illustrated in the FIGS. 3-5.

The databases 124 include an online transactional process database (OLTP) 126 that stores all configuration and interaction data, as well as providing a secure and resilient way of holding information and enables data extraction using standard database reporting tools. The databases 124 may be held on a physically separate machine from the server-side services 112 or on the same physical location. The OLTP database 126 stores all of the data needed for interaction case manipulation and/or execution. The data mart (DM) database 127 is a reporting database configured so that reporting does not have to be done from the OLTP database 126. The knowledge database 129 is utilized for the owner of the engagement management system 100 to store its own website or other information. The configuration module 128 includes a number of configuration applications 130 that are utilized to set-up, maintain and configure the system 100.

Figure 3:
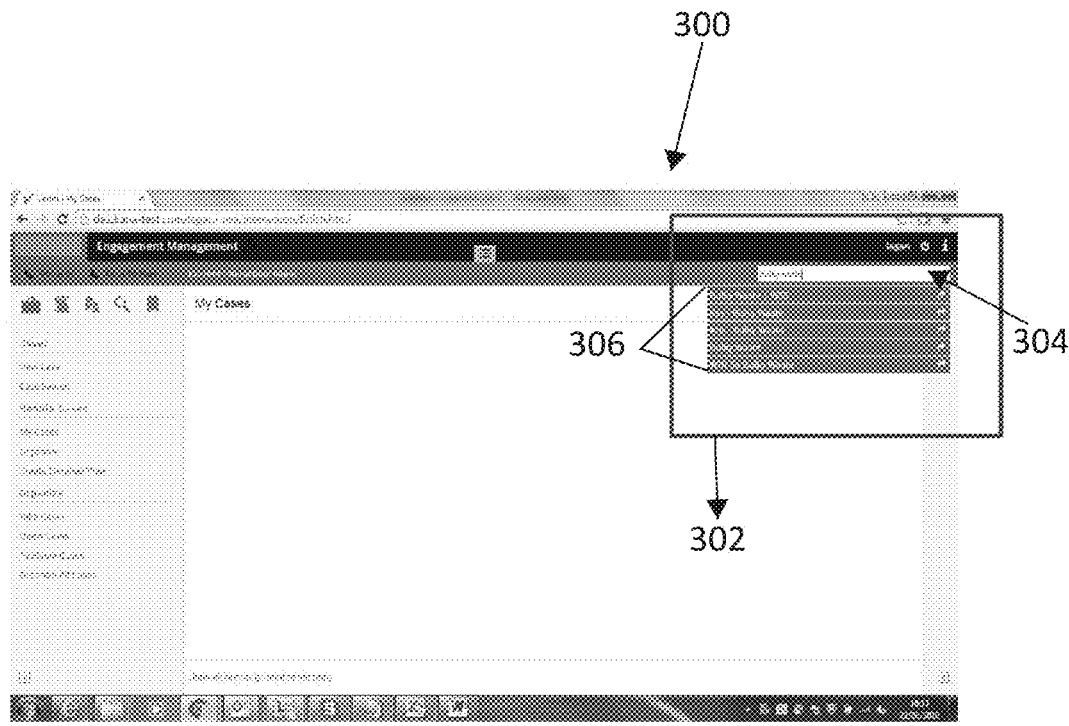
FIG. 3, FIG. 4 and FIG. 5 are screen shots illustrating graphical user interfaces exemplary of an embodiment of the system of the present application.
Figure 4:
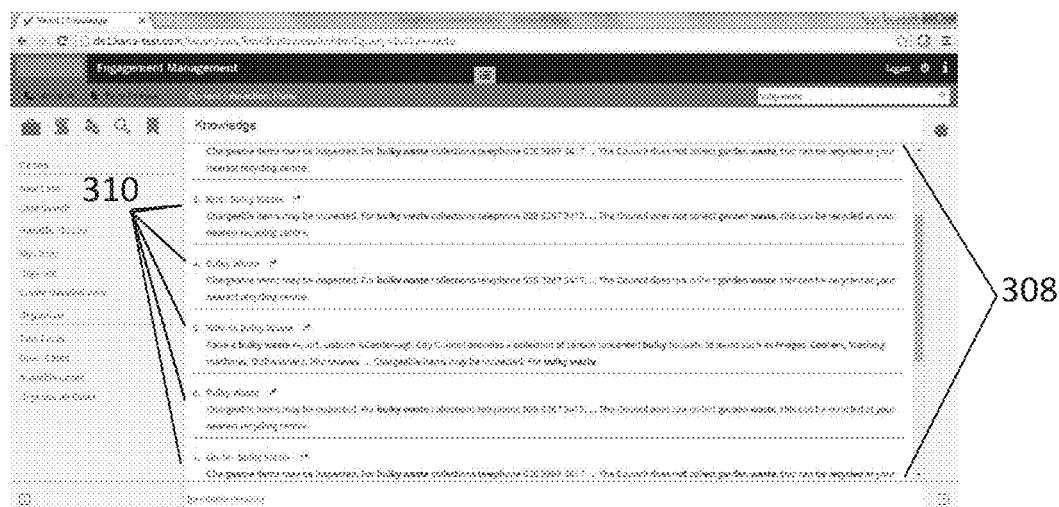
Figure 5:
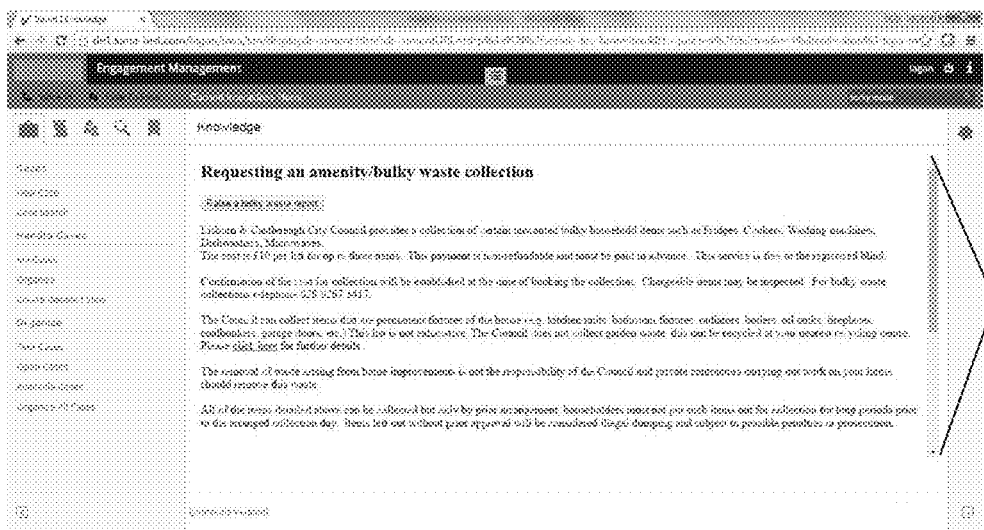

FIG. 3 illustrates a graphical user interface 300 of the system and method of the present application before external content is searched by an agent. Referring to FIGS. 3-5 simultaneously, the graphical user interface 300 first includes an integrated search area 302 that includes both the search term box 304 and the result preview area 306. When an agent wishes to utilize this functionality, the user enters search terms into the search term box 304, and as the agent enters the search terms, the result preview area 306 displays possible search results prior to the agent pressing the return key or selecting the search icon. Referring now to FIG. 4, once the agent presses the return key or selects the search icon, a search results area 308 presents the agent with the search results 310. Here, the agent can review summaries of the search results 310 and select a result that the agent thinks might be useful content for the interaction with the client. Referring to FIG. 5, once the agent selects one of the search results 310, the selected result 312 will display for the agent. Once the agent is finished with the selected result, the agent may return to the search results area 308 to choose another search result 310, or simply close the selected result 312 and discontinue utilizing this feature, and return to the interaction with the client.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. A method of integrating to an external application for an agent in a web client application, the method comprising:
    starting an interaction with a client with the web client application by the agent;
    searching for relevant knowledge content through a third-party integration module using a graphical user interface, wherein the third-party integration module integrates with other systems and applications outside of a current system in order to search for the relevant knowledge content, wherein the other systems and applications outside of the current system are integrated into the graphical user interface; and
    completing the interaction with the client using the graphical user interface with enhanced input from the search step.

2. The method of claim 1, further comprising logging into the web client application by the agent.

3. The method of claim 1, wherein the interaction with the client is any one of a live telephone call, e-mail, face-to-face, or a web chat session with the client.

4. The method of claim 1, further comprising completing the interaction with the client without the knowledge search if the knowledge search feature is not configured.

5. The method of claim 1, wherein the graphical user interface further includes an integrated search area for the search step.

6. The method of claim 1, wherein the graphical user interface includes a search result area, wherein the agent can review a plurality of summaries of a set of search results.

7. A non-transient computer readable medium programmed with computer readable code that upon execution by a computer processor causes the computer processor to:
   start an interaction with a client with the web client application by the agent;
   search for relevant knowledge content through a third-party integration module using a graphical user interface, wherein the third-party integration module integrates with other systems and applications outside of a current system in order to search for the relevant knowledge content, wherein the other systems and applications outside of the current system are integrated into the graphical user interface; and
   complete the interaction with the client using the graphical user interface with enhanced input from the search step.

8. The medium of claim 7, further comprising that the agent logs into the web client application.

9. The medium of claim 7, wherein the interaction with the client is any one of a live telephone call, e-mail, face-to-face, or a web chat session with the client.

10. The medium of claim 7, further comprising completing the interaction with the client without the knowledge search if the knowledge search feature is not configured.

11. The medium of claim 7, wherein the graphical user interface further includes an integrated search area for the search step.

12. The medium of claim 7, wherein the graphical user interface includes a search result area, wherein the agent can review a plurality of summaries of a set of search results.

13. A system for integrating to an external application for an agent in a web client application, the system comprising:
   a client graphical user interface;
   a server-side application module in communication with the client graphical user interface over a network;
   a third-party integration module in communication with the server-side module; and
   a processing system communicatively connected to the third-party integration module, the server-side application module and the client graphical user interface such that the processing system allows the client graphical user interface to seamlessly integrate the external application into the client graphical user interface through the third-party integration module and the server-side application module, wherein the third-party integration module integrates with other systems and applications outside of the current system in order to search for the relevant knowledge content.

\* \* \* \* \*

UNITED STATES PATENT AND TRADEMARK OFFICE
CERTIFICATE OF CORRECTION

PATENT NO. : 9,986,093 B2
APPLICATION NO. : 15/217240
DATED : May 29, 2018
INVENTOR(S) : Conor Adams Page 1 of 1

It is certified that error appears in the above-identified patent and that said Letters Patent is hereby corrected as shown below:

In the Specification

Column 1, Line 55 should read as follows:
"non-transitory computer readable medium programmed with"

In the Claims

Column 7, Line 4 Line 1 of Claim 7 should read as follows:
"A non-transitory computer readable medium programmed"

Signed and Sealed this
Twenty-ninth Day of September, 2020

Andrei Iancu
*Director of the United States Patent and Trademark Office*